May 9, 1950 B. A. WILLIAMSON 2,506,822
NUTCRACKING IMPLEMENT
Filed June 2, 1947 2 Sheets-Sheet 1
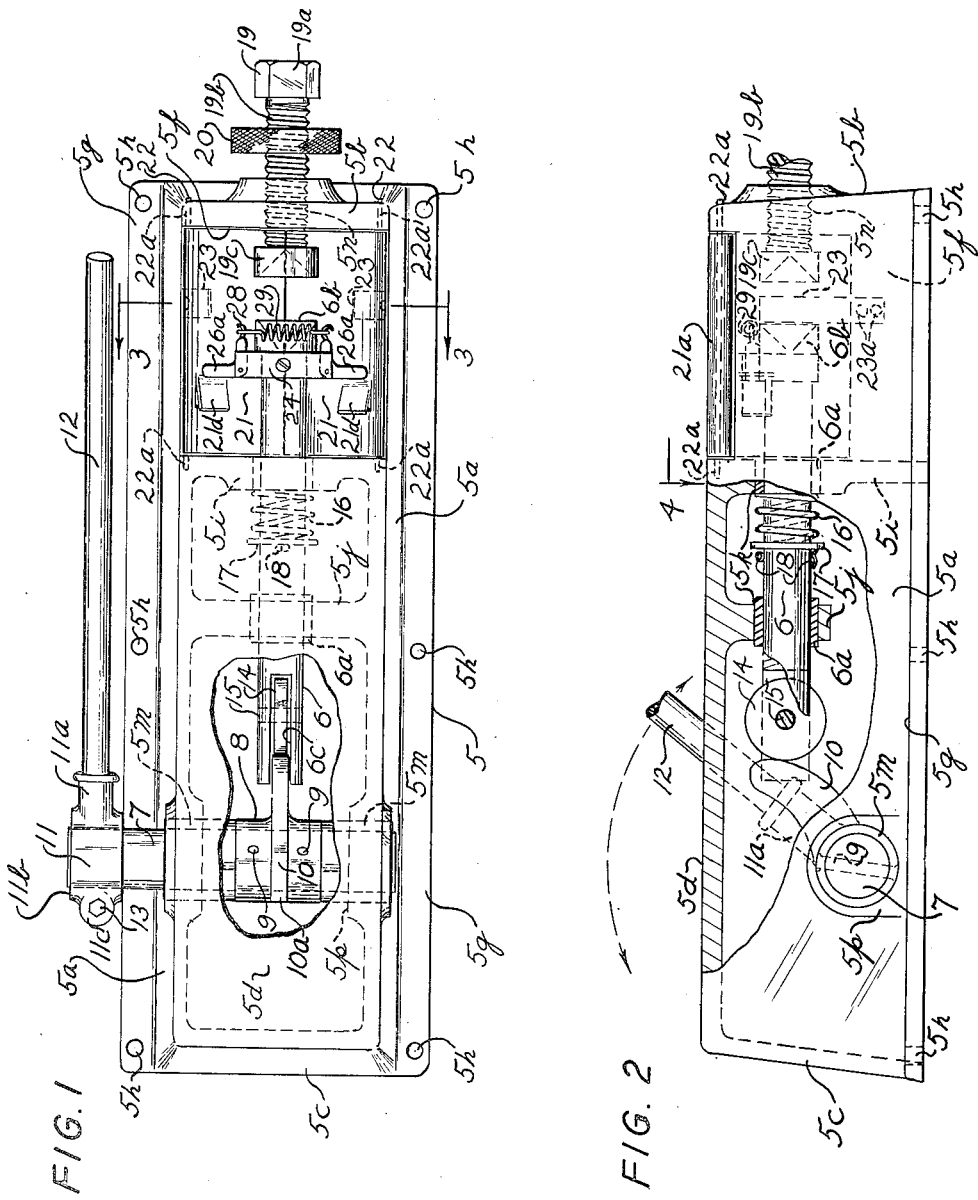
INVENTOR.
BENJAMIN A. WILLIAMSON
BY
ATTY May 9, 1950     B. A. WILLIAMSON     2,506,822
NUTCRACKING IMPLEMENT
Filed June 2, 1947     2 Sheets-Sheet 2
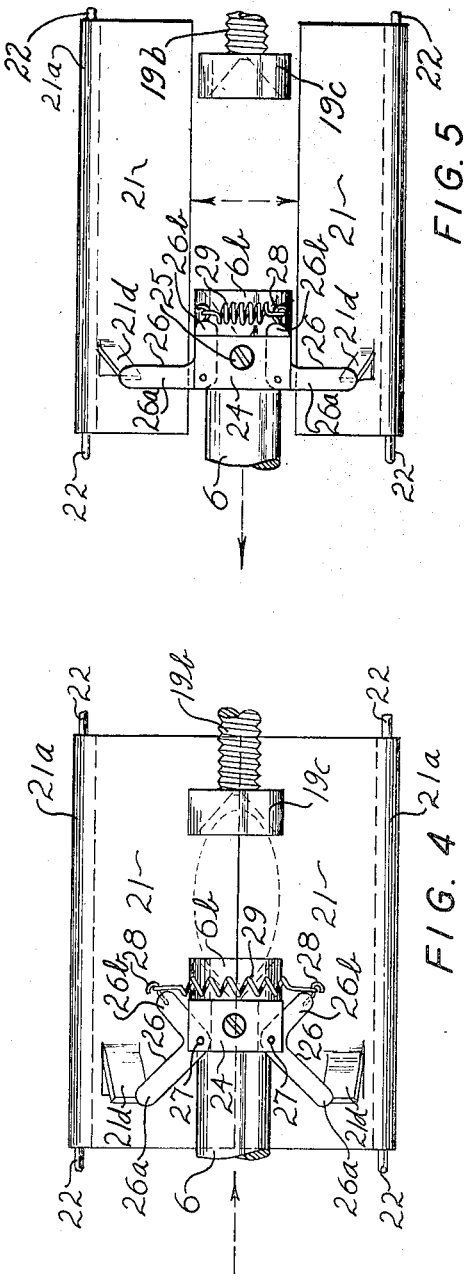
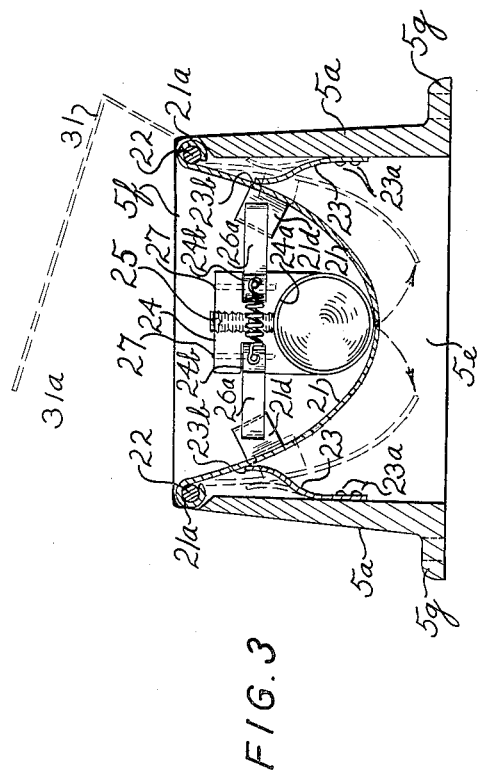
INVENTOR.
BENJAMIN A. WILLIAMSON
BY Patented May 9, 1950

2,506,822

UNITED STATES PATENT OFFICE 2,506,822

NUT-CRACKING IMPLEMENT

Benjamin A. Williamson, St. Louis, Mo.

Application June 2, 1947, Serial No. 751,826

5 Claims. (Cl. 146—16)

This invention relates to nut crackers, and more particularly to implements of this kind which are designed for cracking what may be termed as elongated nuts, such as pecans and the like.

Nut-cracking machines, as heretofore used, have been of two general types, viz: (a) structures designed for quantity production activities, and generally operative under the conditions of power drive, and (b) structure operative under manual power, and thus of a materially lower quantity production condition.

Each type has its advantages and disadvantages. For instance, the power-drive type, in which the structure is arranged for substantially complete automatic operation, the structure takes the nuts from a bin supply individually, positions them for cracking, and delivers the cracked nut to a product receptacle; since the operation is automatic, the apparatus is large and complicated, due to the necessity for accurate timing of the special sequences of operation which are required in completing the cycle. The type is especially useful where the product is being marketed with the shells removed—only the meat is marketed—a condition which renders quantity production practically a necessity. The disadvantages come through the fact that the automatic cycle tends to require close uniformity of nut dimensions and shell formations, as well as to tend to limit the procedure to nuts of particular type, thus tending to limit the types of nuts which can be efficiently treated by the apparatus.

One of the disadvantages comes from the fact that the product is marketed in its unshelled form. Since the shell of the nut has been removed, the meat is exposed and thus liable to deterioration unless given treatment such as to tend to prevent this difficulty. Because of this condition many customers prefer to purchase the nuts unshelled, since deterioration is less, in addition to which types of nuts in which the meat is not readily removable (thus incapable of efficient treatment by the power type of mechanism) must be purchased in such unshelled form, and afterwards cracked.

This latter condition can and is being met by the use of structures of the manually-operated type. These structures are mounted on the counters, etc., of the retailing stores, and permit the dealer to crack the nuts in the presence of the customer. The nuts are cracked as individuals, and, because of manual operation, the apparatus can be much simpler in structure and less costly. The quantity production per unit of time is materially less than that secured under power drive conditions, but is compensated by the customer's ability to visually inspect the cracking of his purchased nuts. Another advantage comes through the fact that the structure permits the cracking of nuts in which the meat is somewhat intricately bound within the shell and must later be picked out; through visual inspection of the cracking operation, the customer is assured that the cracked meat-containing shells he receives are those of the nuts he purchased. This is a field that cannot well be served by the user of the power-drive type. The present invention pertains more particularly to structures of this manual type, and is designed to render the type more efficient in action and permit of increased quantity production per unit of time.

The principal object of the invention is to provide in small and compact form a relatively simple, practical and efficient nut cracker of the kind referred to, the same being constructed of few parts and of light weight, and hence especially adapted for use in the home, or in confectioneries and stores, as occasion may require.

Another object of the invention is to provide in a nut cracker of the kind referred to, an elongated casing or housing, preferably rectangular in cross-section, a forwardly disposed nut cracking bar and a rearwardly disposed nut cracking bar mounted axially within the casing in co-operative alignment, the inner adjacent ends of these bars being provided with pick-up jaws for engaging the nuts to be cracked, means for adjusting the forward bar inwardly or outwardly of the casing for the purpose of adapting the nut cracker for use upon nuts of varying lengths or sizes, the rear bar being slidably mounted and provided with means for reciprocating the bar and pressing same forwardly towards the forward bar for the purpose of cracking nuts as engaged by the jaws of the two bars and for retracting the rear bar for releasing and dropping the nuts after they are cracked, a pair of small folding doors, wings or flaps hingedly mounted at their outer lateral margins to the upper lateral margins of the open topped forward end of the casing, these flaps being arcuate in cross section, positioned in transverse co-operative alignment with their concaved sides turned upwardly and being spring-set to normally close centrally together immediately below the adjacent inner ends of the said forward and rear nut cracking bars and the pick-up jaws as carried thereby, these flaps thus forming when closed together a trough adapted to receive elongated nuts such as pecans as same are dropped into the forward open topped end or hopper of the casing, and automatically by gravity align them between the separated jaws of the nut cracking bars, in position to be picked up and cracked by these jaws as the rear bar is forced forwardly towards the forward bar for that purpose, and means operable by the retraction of the rear bar for automatically pressing the flaps asunder after the nuts are successively cracked, for discharging the cracked nuts.

With the stated objects in view, together with such other and additional objects and advantages as may appear from the specification, attention is now directed to the accompanying drawing constituting a part of the specification and illustrating a preferred embodiment of the invention, and wherein Figure 1 is a top plan view of a nut-cracker of the kind referred to and as constructed in accordance with this invention, a medial portion of the top side of the rear end of the casing being broken out to show the arrangement of the interior devices and mechanism. In this view the operating lever is shown as pressed down forwardly, for pressing the rear nut cracking bar forwardly to the forward nut cracking bar, as in the process of cracking a nut as picked up by the jaws at the ends of these bars.

Figure 2 is a side elevational view, looking towards the under side of Figure 1, a portion being broken out to show the interior arrangement of the elements. The forward and rearward movements of the operating lever in cracking and ejecting a nut are indicated by the arrow heads. This view assumes to show the lever as being pulled forward and depressed as in the act of cracking a nut, and this stage of operation is further illustrated in Figure 4.

Figure 3 is a cross section on the line 3—3 of Figure 1.

Figure 4 is a detail view in plan, additionally to Figure 2 illustrating the forward movement of the rear nut cracking bar, and the corresponding closed position of the trap-flaps, in the process of cracking a nut.

Figure 5 is a view similar to Figure 4, illustrating however the rearward or retractive movement of the rear nut cracking bar, and the corresponding opened position of the trap-flaps, in the process of ejecting a nut after same is cracked.

In practising this invention, I provide an elongated casing or housing represented generally at 5, the same being preferably rectangular in cross section, closed at the sides as at 5a, at the forward end 5b and at the rear end 5c. The rear portion of the top side is also closed as at 5d, but the bottom side 5e as well as the forward portion of the top side 5f are left open for forming a hopper thereat. This casing is flanged outwardly at the lower margins of the sides 5a as at 5g, and these flanges are bored through as at 5h to provide screw holes through which screws (not shown) may be passed for securing the implement to a table or counter (not shown). An interior partition 5i extended vertically and transversely from the forward margin of the top closure 5d to the base plane of the casing, serves to separate the forward open topped end or hopper portion of the casing from the covered rear portion of the casing containing the driving elements of the invention. Within this covered rear portion of the casing and from the forward end of the cover plate there is depended a transversely extended hanger rib 5j, spaced rearwardly from the partition 5i, and both the hanger rib and the partition are bored through as at 5k on a line extended endwise through the casing in parallelism with and vertically somewhat above the longitudinal axis of the casing, these bores 5k thus forming bearing apertures for slidably receiving a rearwardly disposed nut cracking bar 6 as passed through gaskets 6a seated within the said apertures. The forward end of the bar 6 projects into the forward portion or hopper 5f of the casing, and a nut pick-up jaw 6b is formed or mounted at the extremity of the bar, this jaw being dished or concaved and flared as shown for facilitating its function in manner later explained. Transversely aligned hubs 5p are formed and provided in the sides 5a of the casing 5, these hubs being located in spaced relation rearwardly of the rear end of the bar 6 and adjacent the base of the casing 5. Bearing sleeves 5m are seated in the hubs 5p and an axle-shaft 7 is journaled through the said aligned hubs and sleeves. A cam sleeve 8 is closely fitted medially upon the shaft 7 between the shortened sleeves 5m, and is keyed thereto by means of pins 9 passed through the sleeve into the shaft. A curved cam finger 10 is anchored at 10a medially to the sleeve 8. A socket ring 11 is mounted upon the extended outer end of the shaft 7, this ring being formed with a socket 11a for receiving the operating handle or lever 12. The ring 11 is parted as at 11b, oppositely to the socket 11a, lips 11c are extended at the parting, and a small bolt 13 is passed through these lips and turned up tightly as means for firmly attaching the ring to the end of the shaft. The rear end of the bar 6 is slotted through longitudinally and vertically, as at 6c, in exact alignment with the cam finger 10, which is sized to enter the slot, and a small flat disk or roller 14 is seated freely within this slot and is rotatably secured in place by means of a pin 15 passed through the slotted end of the bar 6 and freely and centrally through the roller. A coiled spring 16 is seated forwardly over the bar 6 and is compressed at its ends between the partition 5i and a stop ring 17 anchored as at 18 upon the bar 6 in spaced relation to the partition 5i. This spring 16 serves to normally force the bar 6 to its rearmost or retracted position against the cam finger 10. The arrangement of the parts is such that as the operating handle 12 is pulled forwardly towards the end 5b of the casing, the cam finger 10 will pass freely into the slot 6c and will contact the roller 14 and force the bar 6 forwardly against the action of the spring 16.

A forwardly disposed nut cracking bar 19 is provided, the same being headed as at 19a and screw threaded as at 19b, and thus threadedly seated through a tapped bore 5n formed through the forward end 5b of the casing 5 in exact longitudinal alignment with the bores 5k of the partition 5i and the hanger rib 5j, whereby the bar 19 is operatively positioned in exact longitudinal alignment with the bar 6. Similarly to the bar 6, the inner end of the bar 19 is provided with a nut pick-up jaw 19c which is likewise dished or concaved and flared as shown, for co-operatively functioning with the jaw 6b of the bar 6 in picking up nuts and cracking and then ejecting them, and as later explained. A lock-nut 20 is seated outwardly upon the threaded bar 19, and by the arrangements shown it is evident that the forward bar 19 may be adjusted inwardly or outwardly of the casing and relative to the bar 6 for the purpose of adapting the machine for use in cracking pecans or similar elongated nuts, of varying sizes and lengths.

A pair of small, elongate folding doors, wings or flaps 21, of thin material and arcuate in cross section, are positioned in transverse co-operative alignment within the forward hopper portion 5f of the casing 5, and are hingedly mounted at their outer lateral margins to the upper lateral margins of this forward end of the casing. This hinged mounting is effected by rolling the margins of the flaps or doors as shown at 21a and passing pins 22 through these rolls, the ends of the pins being seated at 22a in the end 5b of the casing and in the partition 5i thereof. The doors or flaps 21 are mounted in place with their concaved sides turned upwardly and thus adapted to close centrally together immediately below the adjacent inner ends of the bars 6 and 19 and the pick-up jaws 6b and 19c as carried thereby. The wings or flaps 21 are spring-set to normally close together by means of leaf-springs 23 riveted through their lower ends to the sides of the casing as shown at 23a, and bowed inwardly at their free upper ends 23b to contact and resiliently urge the flaps to their closed position.

A squared trigger supporting lug 24, having its lower end arcuately cut away as at 24a for fitting atop the round bar 6, is mounted upon this bar immediately back of the jaw 6b by means of a set screw 25 passed down through the lug into the bar. This lug 24 is notched out on its opposite sides as shown at 24b (Figure 3), and a pair of right angled triggers 26 are pivotally mounted within these notches, in reversed relation, by means of pins 27 passed down through the lateral margins of the lug 24 and through the inserted heels of the triggers. Thus mounted the prongs or legs 26a, 26b project out laterally at each side towards the doors, wings or flaps 21 (Figures 4 and 5), and in a downwardly spaced relation from the upper hinged margins of these flaps. It is to be noted that the longer prongs or legs 26a of these triggers are directed laterally and rearwardly, while the shorter prongs or legs 26b are directed laterally and forwardly. Small hooks 28 are anchored to and extended from the ends of the shorter legs 26b and a small retractile coiled spring 29 is stretched between these hooks (Figures 3, 4, 5), the normal action of this spring being to draw the legs or prongs 26b inwardly and project the legs 26a outwardly. A pair of trigger trips or camming elements 21d are struck inwardly from the rear portions of the flaps 21, in transverse alignment with the trigger legs 26a and so that these legs will contact same as the bar 6 is reciprocated back and forth in the operation of the nut cracker, and it is to be noted that the struck out ends of these trigger trips are directed rearwardly (Figures 4 and 5) while the opposite ends join smoothly with the flaps 21. Thus as the bar 6 is thrust forwardly by a forward pull on the operating lever 12, in the act of cracking a nut, such as represented in dotted lines in Figure 4, the prongs or legs 26a drag over the upraised ends of the trigger trips 21d, and do not affect the flaps or doors 21, which are held closed by the springs 23; but on the reverse or retractive movement of the bar 6, the legs 26a impinge upon the trigger trips 21d, thus forcing the flaps 21 asunder, as shown in Figure 5 and permitting the cracked nut to fall down through and into any receptacle that may be placed underneath.

As will be understood from the above description of the trough or false bottom formation and its operation, the two wings will be in their open positions, dotted lines in Fig. 3, when the structure is not being operated, due to the fact that legs 26a then overlie the edge of the camming members 21d. At this time the elements 26 are in the positions shown in Fig. 5. During the earlier period of the advance of the element 6, thus advancing the pivot of member 26, the legs 26a wipe over the edge of members 21d due to friction with the latter, thus moving the parts to the Fig. 4 positions, rocking member 26 and placing spring 29 under tension; when leg 26a passes off the cam edge by the continued advancing movement of element 6, the legs 26a move off of the edge of members 21d and on to the camming face of such members 21d. This removes the restraint provided by the edges of such camming members 21d, and permits spring 29 to move members 26 pivotally as well as permit springs 23 to apply pressure on the wings 21 to move them into closed position, the two movements providing for a very rapid closing of the wings after the legs 26a leave such edge.

Closing of the false bottom thus takes place well in advance of the head of element 6 reaching a position to engage the nut, thus affording ample time for the dropping of the nut into position after the bottom is closed and before the head of element 6 begins to engage the nut, the element advancing into engagement with the nut, with legs 26a contacting the inner face of the wings which form the trough or false bottom.

When the nut has been cracked, and element 6 begins its retreating movement, legs 26a will travel over the inner face of the closed wings until the legs reach the beginning of the camming members 21d, thus releasing the cracked nut from the heads while the false bottom is still closed and is acting as a trough. When, however, legs 26a reach the camming members and the continued retreat of element 6 causes the legs to traverse the members 21d, the element 26 cannot rock further inward due to the contact of leg 26b with the lug shoulder, and hence, as leg 26a traverses the camming member with leg 26b unyielding, such leg 26a cooperates with the camming face of member 21d to produce a camming action effective to gradually open the wings of the false bottom as element 6 retreats. The leg 26a reaches the edge zone of the camming member practically at the end of the retreating movement, any further rearward retreat of element 6 causing the leg 26a to ride on such edge until the cycle is complete, leaving the parts in the position in Fig. 5 and the dotted line position of the wings in Fig. 3, with the false bottom in open position.

A lid 31 may be hinged over the hopper 5f if desired (Figure 3), to prevent nut shells from flying out when the machine is in use. If such lid is used, the flange of the lid is omitted at the side opposite the hinges, thus providing an opening 31a for the insertion of the nuts when the lid is closed down.

The machine thus described, when in idle position, has the lever 12 in raised position, the head 6b is in its rearmost position, thus separating the heads their maximum distance determined by the adjusted position of head 19c, and the wings 21 are open, the position shown in dotted lines in Fig. 3. To provide the cycle of operation, the operator grasps the end of lever 12 with one hand and a nut with the other, and begins the downward swinging of the lever. The initial response to this is the closing of the wings 21 to the closed position, and during this period the nut is dropped through the open top of the cracking compartment, coming to rest upon the closed wings with its direction of length properly located for engagement by the heads, head 6b of which is advancing. Continuation of the advance of head 6b causes the nut to be gripped in its end zones by the two heads, thus setting up a resistance which is felt by the operator who then continues his lever movement to apply the cracking pressure. Standing in the immediate vicinity of the cracking compartment, he is able to determine by sound when the shell is properly cracked, after which he reverses the direction of movement of the lever, an action which causes head 6b to begin its retreating stroke through activity of spring 16. The latter movement releases the cracked nut from the heads to fall on to the false bottom, the latter being closed, where it remains until the head 6b is approaching the rear end of its retreating stroke, at which time the cooperating members 26a and 21d become active to swing the wings outwardly to open the false bottom and release the nut. During this period of cracking the nut, the empty hand takes up another nut and is thus prepared for the beginning of a new cycle in immediate succession to the return of head 6b to its rear position. Hence, the machine, although operating under manual conditions, permits of practically continuous operation, thus materially increasing the capacity per unit of time.

The machine provides several important advantages. For instance, the particular arrangement which permits the operator to stand in the immediate vicinity of the cracking compartment is provided by the arrangement of lever 12. In this location he is able to not only control the pressure, but, through hearing the sound produced by the cracking of the nut, he is able to prevent crushing of the meat through over-pressure application, the length of the lever stroke being wholly under his control. Since shell walls of nuts (even of the same type) differ in thickness and resistance to pressure, the operator is able to provide the proper pressure as well as length of stroke to assure against material damage to the meat of the nut. This is somewhat in contrast with the power drive machines which use an automatic cycle; even where such machines are capable of varying the length of the stroke, the latter depends entirely upon the overall length of the nut, with no possibility of varying such stroke length to meet the conditions of variations in wall thickness of the shell, one of the conditions which limit the field to nuts which can be efficiently cracked with machines of the power drive type.

Another important advantage, fundamental in connection with manually-operated machines, is the presence of the false bottom. Power drive machines are equipped with this feature, essential because of the automatic cycle, but the feature has heretofore been absent from the manually-operated type. This is due primarily to the fact that the false bottom must be movable between open and closed position, by separating wings or by a dumping mechanism, in an accurate and controlled timing relation to the remainder of the operation. In power drive structures, this is possible due to the presence of a drive shaft rotating constantly in the same direction and which, through the operation of a cam mounted on the shaft, is able to produce the proper operation together with its timing. Manually-operated structures, however, do not employ a drive shaft, or a shaft or equivalent structure which rotates constantly in but one direction; the one movable element which is available for the purpose, is the stem of the movable head, and this moves in a reciprocating cycle and thus in opposite directions, in addition to which the direction of reciprocation is at right angles to the direction of rotation of the drive shaft of the power drive type. To provide an efficient false bottom structure to the manually-operated type has heretofor been deemed practically impossible because of these conditions.

Where the false bottom is absent, it becomes necessary for the operator to not only deliver the nut manually, but also to position it for gripping by the heads used in cracking so that the fingers of the operator are in the immediate vicinity of the heads while they are in motion. Unless extreme care is taken in the operation, there is likelihood of the fingers being caught; with the sudden release of resistance by the nut due to cracking, pressure on the lever is likely to result in excess and unneeded movement of the movable head with the result that the fingers may be nipped if not withdrawn in time, and over-crushing of the nut may also result. These conditions occur with frequency with prior manual structures when the attempt is made to increase the rate of production. The finger-nipping can be avoided by slowly bringing the heads into the gripping position and then momentarily stopping the lever movement to permit removal of the fingers, and then resuming the cracking movement of the lever, thus materially increasing the time length of a cycle.

These conditions are avoided in the present machine through the fact that the fingers do not enter the cracking compartment when the machine is in service. Even if adjustment of head 19c is necessary, the adjustment is made outside of the compartment. Hence, it is not necessary for the operator to take his attention from the actual cracking operation and the control of the length of the lever stroke, the amount of pressure applied, etc., thus enabling efficient cracking of the nuts without danger of over-crushing, and at the same time materially shortening the time length of a cycle.

While I have here shown and described a particular form of the invention, and particular structural features thereof, it is to be understood that the specific form and features as shown may be changed or modified as desired, in minor details and within the scope of the claims.

I claim:

1. In a nut-cracker, a housing, a pair of axially aligned cooperating nut cracking bars in the housing and one of said bars being supported for reciprocating movements with respect to the other from a normal position toward the other bar for cracking a nut and return to such normal position to clear the nut so that it may fall, cooperating flaps movably supported in the housing and extending from opposite sides inwardly and downwardly beneath the bars to position a nut for cracking between the bars, cooperating means on the flaps and the reciprocating bar for spreading the flaps apart as that bar returns toward its normal position allowing the cracked nut to drop between the flaps, and the said flap spreading means on the reciprocating bar including trigger elements operative to first spread the flaps as the bar starts its return movement and then release the flaps again to return to closed position ready for the next nut as the bar reaches its normal position.

2. In a nut-cracker, a housing, a pair of axially aligned cooperating nut cracking bars in the housing and one of said bars being supported for reciprocating movements with respect to the other from a normal position toward the other bar for cracking a nut and for return to such normal position to clear the nut so that it may fall, means for reciprocating the bar, cooperating swingable and spring set flaps hinged at their outer edges to the housing and extending in normal closed positions angularly down beneath the bars for supporting and positioning a nut between the bars for cracking, camming elements extending inward from the flaps, and trigger elements on the reciprocating bar operative to push outward on said camming elements as that bar starts its return motion after cracking a nut and so as to momentarily spread the flaps and allow the cracked nut to drop.

3. In a nut-cracker of the character described, a housing, a pair of axially aligned and cooperating nut cracking bars aligned and arranged in said housing, and one of said bars being supported for reciprocating movements with respect to the other for cracking a nut placed therebetween, manually operative means for reciprocating the bar, cooperating hopper-forming flaps hinged at their outer edges to the housing at each side and extending downwardly toward each other beneath the bars for positioning a nut in cracking position between the bars, camming elements projected inward from the flaps, triggers mounted on the reciprocating bar and operative to engage and urge said camming elements outward and momentarily spread the flaps as the reciprocating bar moves back after cracking a nut, and the said camming elements being so located that the triggers will clear them as the reciprocating bar continues and completes its motion away from the other bar and thereby allow the flaps to return to nut positioning condition ready for the next nut.

4. In a nut-cracker, a housing, a pair of axially aligned cooperating nut cracking bars in the housing and one of said bars being supported for reciprocating movements with respect to the other from a normal position toward the other bar for cracking a nut and for return to such normal position to clear the nut so that it may fall, means for reciprocating the bar, cooperating swingable and spring set flaps hinged at their outer edges to the housing and extending in normal closed positions angularly down beneath the bars for supporting and positioning a nut between the bars for cracking, camming elements extending inward from the flaps, trigger elements on the reciprocating bar operative to cam outward on said camming elements as that bar starts its return motion after cracking a nut to momentarily spread the flaps and allow the cracked nut to drop, the said camming elements being so located that the trigger elements will clear them as the reciprocating bar returns to its normal position and allow the flaps to close again ready for the next nut, and the trigger elements being pivotally supported to swing clear as they pass the camming elements without spreading effect on the flaps as the reciprocating bar moves toward the other in cracking a nut.

5. In a nut-cracker, a housing, a pair of axially aligned cooperating nut cracking bars in the housing and one of said bars being supported for reciprocating movements with respect to the other from a normal position toward the other bar for cracking a nut and for return to such normal position to clear the nut so that it may fall, means for reciprocating the bar, cooperating swingable and spring set flaps hinged at their outer edges to the housing and extending in normal closed positions angularly down beneath the bars for supporting and positioning a nut between the bars for cracking, camming elements extending inward from the flaps, trigger elements on the reciprocating bar operative to cam outward on said camming elements as that bar starts its return motion after cracking a nut to momentarily spread the flaps and allow the cracked nut to drop, the said camming elements being so located that the trigger elements will clear them as the reciprocating bar returns to its normal position and thereby allow the flaps to close again ready for the next nut, the trigger elements being pivotally supported to swing clear as they pass the camming elements without spreading effect on the flaps as the reciprocating bar moves toward the other in cracking a nut, and the trigger elements being spring set to return to position for camming operating on the flaps as the reciprocating bar again returns toward its normal position.

BENJAMIN A. WILLIAMSON.

REFERENCES CITED

The following references are of record in the file of this patent:

UNITED STATES PATENTS

| Number | Name | Date |
| --- | --- | --- |
| D. 139,576 | Carlson | Nov. 28, 1944 |
| 537,477 | North | Apr. 16, 1895 |
| 1,004,611 | White | Oct. 3, 1911 |
| 1,521,345 | Turmes | Dec. 30, 1924 |
| 1,555,518 | Ramey | Sept. 29, 1925 |
| 2,114,243 | Whitehead et al. | Apr. 12, 1938 |
| 2,273,759 | Maulsby | Feb. 17, 1942 |
| 2,294,358 | Aber | Sept. 1, 1942 |